(No Model.)
G. C. PETTIS.
METAL LAST.
No. 528,737. Patented Nov. 6, 1894.
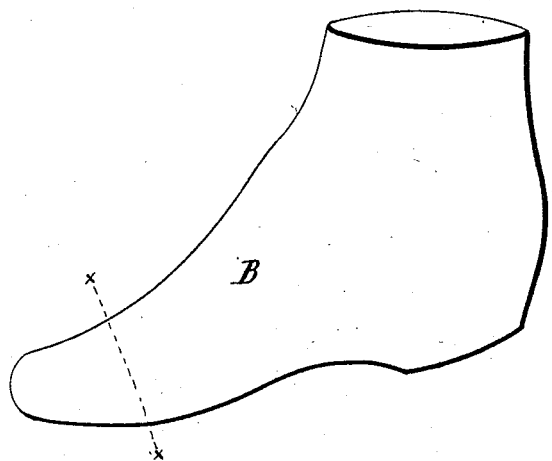
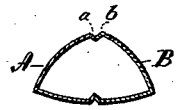
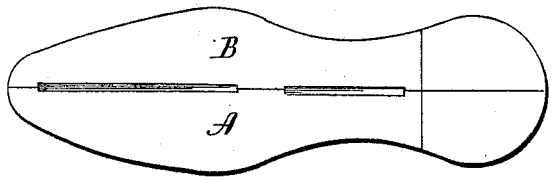
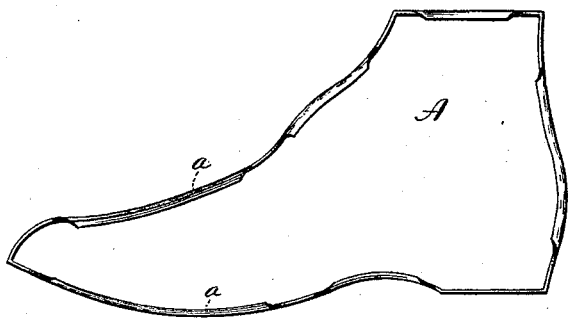
Witnesses
J. H. Shumway
Lillian D. Kelsey
George C. Pettis
Inventor
By atty
Earle Seymour

UNITED STATES PATENT OFFICE.

GEORGE C. PETTIS, OF NEW HAVEN, CONNECTICUT, ASSIGNOR TO THE UNITED STATES RUBBER COMPANY, OF NEW BRUNSWICK, NEW JERSEY.

METAL LAST.

SPECIFICATION forming part of Letters Patent No. 528,737, dated November 6, 1894.

Application filed April 9, 1894. Serial No. 506,912. (No model.)

*To all whom it may concern:*

Be it known that I, GEORGE C. PETTIS, of New Haven, in the county of New Haven and State of Connecticut, have invented a new Improvement in Metal Lasts; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a last; Fig. 2, an under side view of the same; Fig. 3, an inside view of one portion of the last showing the beveled edge; Fig. 4, a transverse section on line $x$—$x$ of Fig. 1.

This invention relates to an improvement in sheet-metal lasts, and is an improvement on the last patented to Edward S. Smith, September 24, 1889, No. 411,622. The practical way of uniting the edges of the last shown in this patent, is by brazing or soldering. As it is desirable to form the last from thin metal, the abutting edges of the last are necessarily very thin, so that there is very little material for the brazing metal or solder to unite with, and consequently the parts are liable to become separated.

In forming lasts from sheet-metal it is very important that each part of the last should be of certain size, as the variations between lasts for different sizes of shoes are very slight.

The object of this invention is to form a portion of the edges of the abutting portions of the last so as to permit a considerable amount of brazing metal or solder to be employed, and increase the area to which the brazing metal or solder may adhere, and at the same time avoid the possibility of intentionally changing the size of the last, it being understood that the outer surface of the last must be perfectly smooth, and the invention consists in the construction as hereinafter described and particularly recited in the claim.

I would have it understood that this invention, like that of the patent above referred to, is equally applicable to boot-trees, and by the term "lasts" as hereinafter used, I wish to be understood as including shoe-lasts or boot-trees.

In carrying out my invention, I prefer to form the lasts of two parts A B, which may be readily struck from sheet-metal in suitable dies. The edges of these two parts are to be abutted and united by brazing or solder, to form a complete last. To form a strong joint between the parts, I turn or crimp a portion of the edge of each part inward, forming a slight bevel $a\ b$, as indicated in Fig. 4. This bevel extends over the instep, partially across the top, partially down the back, and partially across the heel and sole portions, leaving the edges at the intermediate points in their normal condition. As above stated this is necessary in order that the size of the last may be maintained. The two parts of the last thus formed are placed together, and the turned in edges form a channel, as shown in Fig. 2, in which the brazing material or solder may be applied, the brazing material or solder $c$ filling the channel flush with the outer surface of the last. This channel gives a considerable amount of adhering surface to the brazing material or solder, and forms a very strong connection between the two parts of the last, and permits the surface of the last to be finished without danger of separating the parts.

While I prefer to form the last in two parts, as above described, it may be formed in several parts, as shown in the patent before referred to. I therefore do not wish to be understood as limiting this invention to the particular form of last shown, nor do I wish to be understood as claiming broadly a sheet-metal last, but, I am aware that it is not broadly new to bevel the adjacent edges of articles made from metal to form a channel for brazing material. I therefore do not wish to be understood as claiming broadly a joint formed in this way.

What I do claim is—

A last constructed from sheet-metal in several parts a portion of the adjacent edges of each part set inward forming a series of channels between the parts, said channels filled with brazing material, whereby the parts are firmly united, substantially as described.

In testimony whereof I have signed this specification in the presence of two subscribing witnesses.

GEORGE C. PETTIS.

Witnesses:
J. M. COLGAN,
HARRY B. KENNEDY.